United States Patent
Brown

[15] 3,652,057
[45] Mar. 28, 1972

[54] MOTOR VEHICLE ENGINE WINCH

[72] Inventor: Jack H. Brown, 904 Erica Street, Escondido, Calif. 92025

[22] Filed: Mar. 23, 1970

[21] Appl. No.: 21,803

[52] U.S. Cl............................................................254/139.1
[51] Int. Cl..................................................................B66c 23/60
[58] Field of Search..................................254/139, 145, 166; 212/133-135

[56] References Cited

UNITED STATES PATENTS

| | | | |
|---|---|---|---|
| 2,848,120 | 8/1958 | Harmon | 212/135 |
| 1,920,989 | 8/1933 | Layhon | 254/139.1 |
| 2,072,398 | 3/1937 | Faulk | 254/145 |
| 2,659,092 | 11/1953 | Conyers | 254/139.1 |
| 1,915,900 | 6/1933 | Moody | 254/145 |
| 3,447,785 | 6/1969 | Brown | 254/145 |

FOREIGN PATENTS OR APPLICATIONS

| 691,634 | 3/1930 | France | 254/145 |
|---|---|---|---|
| 228,437 | 7/1963 | Austria | 212/134 |

Primary Examiner—Harvey C. Hornsby
Attorney—Richard K. Macneill

[57] ABSTRACT

A motor vehicle engine winch having a hollow T-shaped structural member being supported at each end at the top of the T-shaped structural member by a pair of adjustable legs and having a threaded shaft slidably received by another member's end carrying a captured nut therein; a tension cable attached to the captured nut passing downwardly through a bottom wall of the member of the T-shaped structural member in which the threaded shaft is received; the tension cable being attached to a bar suspending a pair of hooks therefrom for engagement with a vehicle motor; an L-shaped structural member attached at one end to the member in which the threaded shaft is passed carrying a hook member for engagement with a vehicle's rear bumper; the hook member being dimensioned for compressing and removing an engine compartment lid spring via a clamp member attached thereto.

2 Claims, 4 Drawing Figures

PATENTED MAR 28 1972 3,652,057
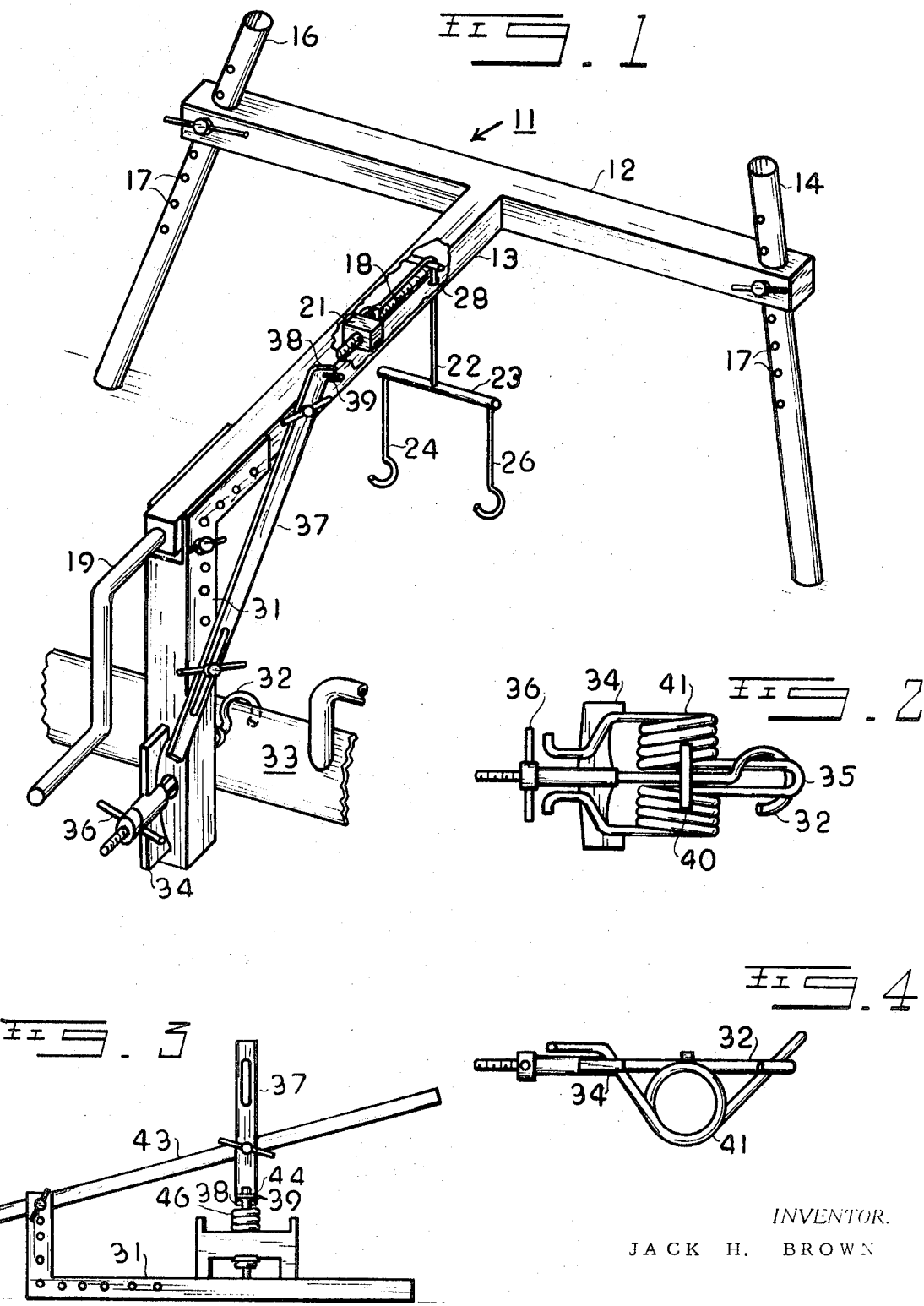
INVENTOR.
JACK H. BROWN

MOTOR VEHICLE ENGINE WINCH

BRIEF DESCRIPTION OF THE INVENTION

The present invention relates to a vehicle motor winch and more particularly to a vehicle motor winch adapted for removing rear-mounted engines from vehicles.

According to the invention, a hollow T-shaped structural member is provided having one member integrally connected at the center of a second member. The ends of a second member are adjustably attached to two legs and the end of the first member attached to an L-shaped structural member which, in turn, carries a hook for engagement with the bumper of a vehicle. The first member slidably receives a threaded shaft and carries a captured nut threadably engaged with the threaded shaft. A tension cable is attached to the captured nut and passed through the wall of a first member carrying a plurality of hooks for the removal of a motor. The structure is particularly dimensioned and geometrically designed for removing the motors from vehicles in which the motor is mounted in the rear of the vehicles, such as a Volkswagen. The bumper hook carries a spring clamp for engagement with an engine compartment lid spring which must be removed to remove the engine compartment lid for placement of the winch over the engine. The L-shaped member is designed for cooperation with a structural brace for removal of an engine valve spring keeper which lends versatility to the tool.

An object of the present invention is the provision of a vehicle engine winch and more particularly to a vehicle engine winch for removing engines that are mounted in the rear of a vehicle.

Another object of the present invention is the provision of a vehicle engine winch bumper hook and spring clamp that can be utilized for removing engine compartment lid springs of certain vehicles.

A further object of the invention is the provision of a vehicle engine winch, a part of which can be utilized for removing valve spring keepers from a vehicle engine.

Yet another object of the invention is the provision of a vehicle engine winch which is inexpensive to manufacture and assemble and is extremely durable and versatile.

Other objects and many of the attendant advantages of this invention will be readily appreciated as the same becomes better understood by reference to the following detailed description when considered in connection with the accompanying drawings in which like reference numerals designate like parts throughout the FIGS. thereof and wherein:

FIG. 1 is a perspective view of the preferred embodiment of the present invention;

FIG. 2 is a top view of a part of the present invention utilized in removing an engine compartment lid spring;

FIG. 3 is a side elevation of a part of the invention utilized in removing a valve spring keeper of a vehicle engine; and FIG. 4 is a top view of the side elevation of FIG. 2.

DETAILED DESCRIPTION OF THE DRAWINGS

Referring to FIG. 1, a T-shaped member 11 has a cross member 12 intersected by member 13. Cross member 12 slidably receives vertical legs 14 and 16 which are adjustable in mounting holes 17. As can be seen, members 12 and 13 are hollow, member 13 slidably receiving a threaded shaft 18 having a projecting handle 19 therefrom. Threaded shaft 18 carries a captured nut 21 which is attached to a tension cable 22 which is, in turn, attached to structural member 23 carrying hooks 24 and 26. Tension cable 22 passes over a supporting bar 27 and down through an aperture 28 in bar 13.

An L-shaped structural member 31 is adjustably attached to bar 13 and carries a hook 32 for engagement with a bumper 33. Hook 32 carries a spring clamp 34 which is engaged with a threaded adjustment nut 36 on a threaded section of hook 32. Structural member 37 is adjustably attached between member 13 and L-shaped member 31 and has a pair of right angle extensions 38 and 39.

Referring to FIG. 2, hook 32 is shown in engagement with an engine compartment lid spring 41 with spring clamp 34 also in engagement therewith. Restraining member 40 is attached to hook 32 for restraining relative movement on spring extension 35.

Referring to FIG. 3, L-shaped member 31 is coupled to structural member 37 by linkage 43 with right angle extensions 38 and 39 coupled to the head of valve spring keeper 44 which is carried by valve spring 46.

Referring to FIG. 4, hook 32 and spring clamp 34 are seen engaging engine compartment led spring 41.

OPERATION

Referring back to FIG. 1, it can be seen that in a Volkswagen, for example, the entire assembly will fit over the engine compartment in the rear of the vehicle. In the case of the square-back or station wagon models, legs 14 and 16 would be removed, but in the case of the standard models, the legs would be adjusted for achieving a horizontal positioning of bar 13. After the unit is in place with hook 32 engaging bumper 33, handle 19 is rotated until hooks 24 and 26 are in engagement with the engine (the engine mounting bolts having been removed) and handle 19 rotated in the opposite direction for pulling the engine out of its mounting area for easy accessibility thereto.

Referring to FIGS. 2 and 4, in the Volkswagen models in particular, the engine compartment lid is held by a spring such as shown at 41. In this case, the spring clamp 34 and hook 32 combine with the adjusting nut 36 to compress the spring until it can be removed from the vehicle.

Referring to FIG. 3, it can be seen that through the use of linkage 43, L-bracket 31 and structural member 37 can be utilized to pull a valve spring keeper such as 39. This is due to the right angle extensions 38 and 39 on structural member 37 being dimensioned for fitting under the head of valve spring keeper 44.

It should be understood, of course, that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. A motor vehicle engine winch for removing rear-mounted engines from an engine compartment of a vehicle comprising:

A T-shaped structural member having a first hollow support member fixedly attached at the center of a second support member;

a threaded shaft slidably received by said hollow support member;

a captured nut in threadable engagement with said threaded shaft;

an aperture in said hollow support member;

a tension cable attached to said captured nut and passing through said aperture, said tension cable carrying a hook for being attached to a vehicle engine; a manually operated handle attached to said threaded shaft for sliding said nut along said hollow support member to raise and lower said hook; and an L-shaped structural member being attached by one leg to said hollow structural member and adjustably carrying a hook on one end for being removably attached to a vehicle bumper said hollow support member extending to a position horizontally over said engine compartment and being supported in said horizontal position by said L-shaped bracket and bumper at one end and by said second support member resting on said compartment or being provided with adjustable and removable legs.

2. The motor vehicle engine winch of claim 1 wherein said legs comprises:

first and second legs adjustably and removably attached to opposite ends of said second structural member.